July 24, 1962  J. J. RODTH ETAL  3,045,869
BEVERAGE DISPENSING APPARATUS AND METHOD
Filed Dec. 17, 1958  5 Sheets-Sheet 5

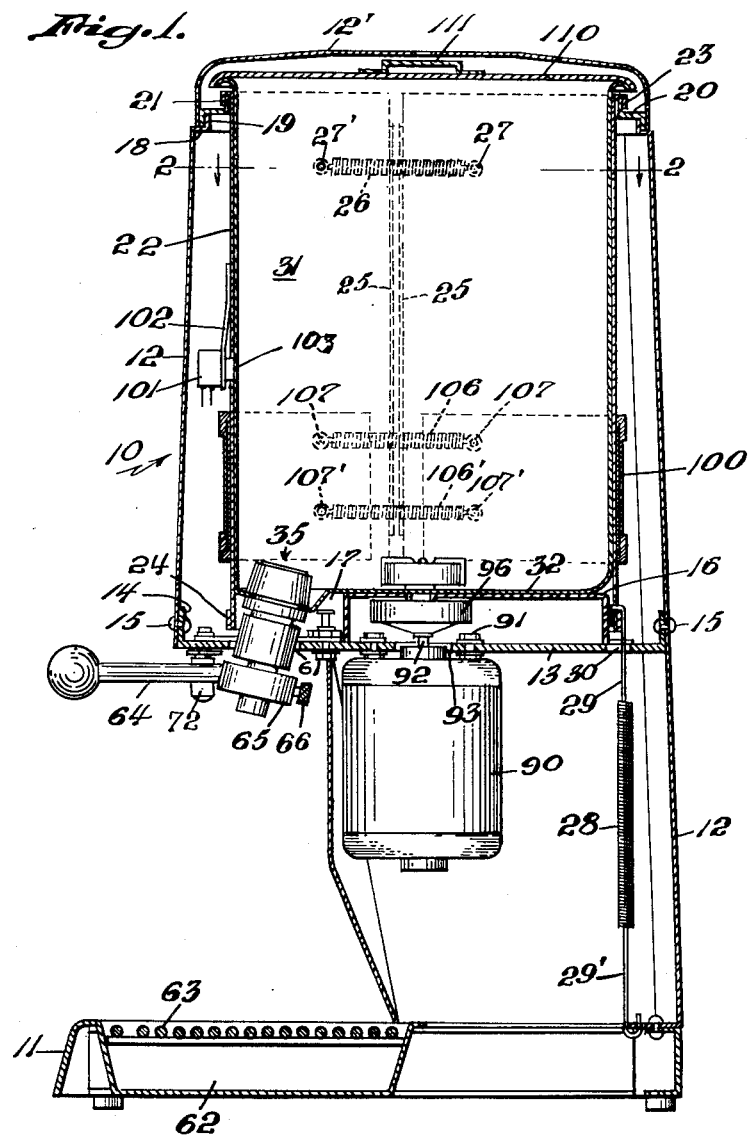

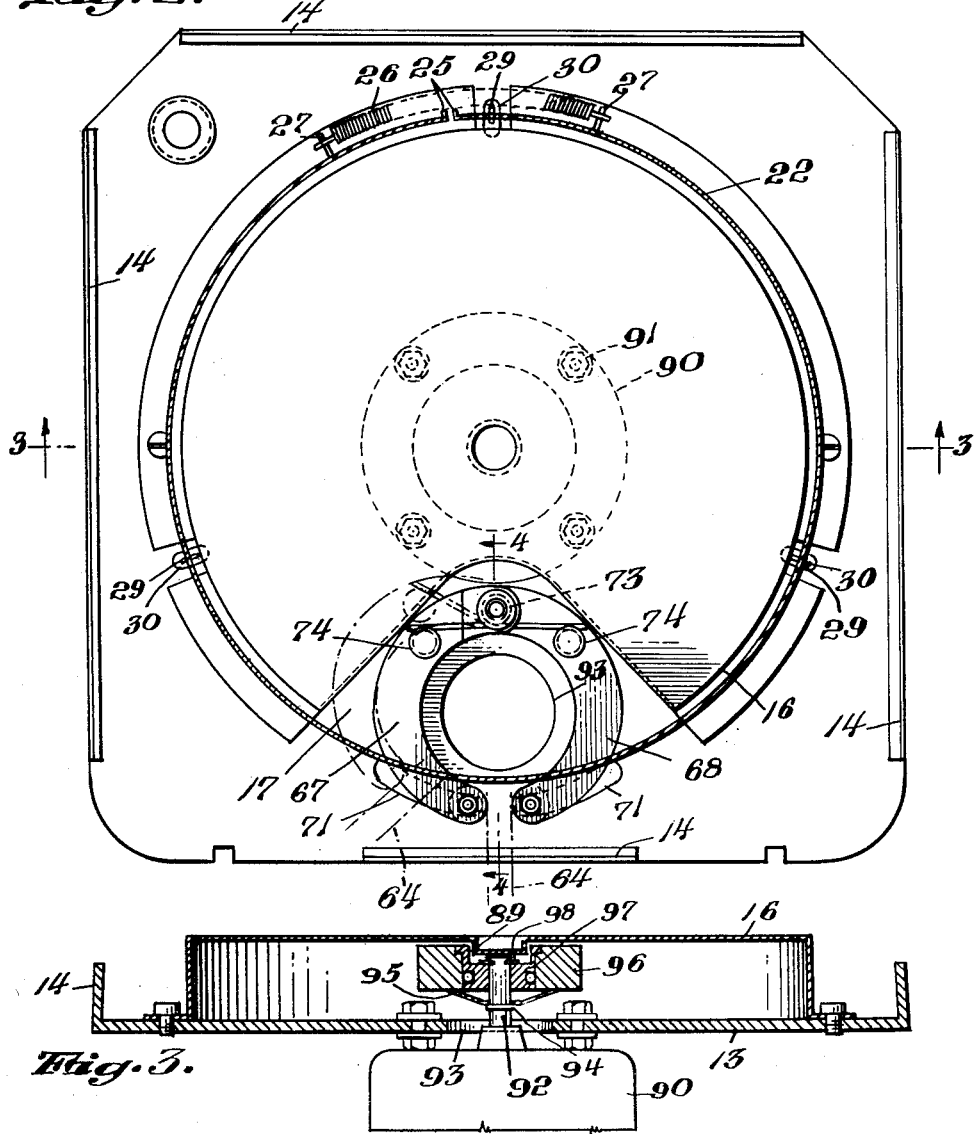

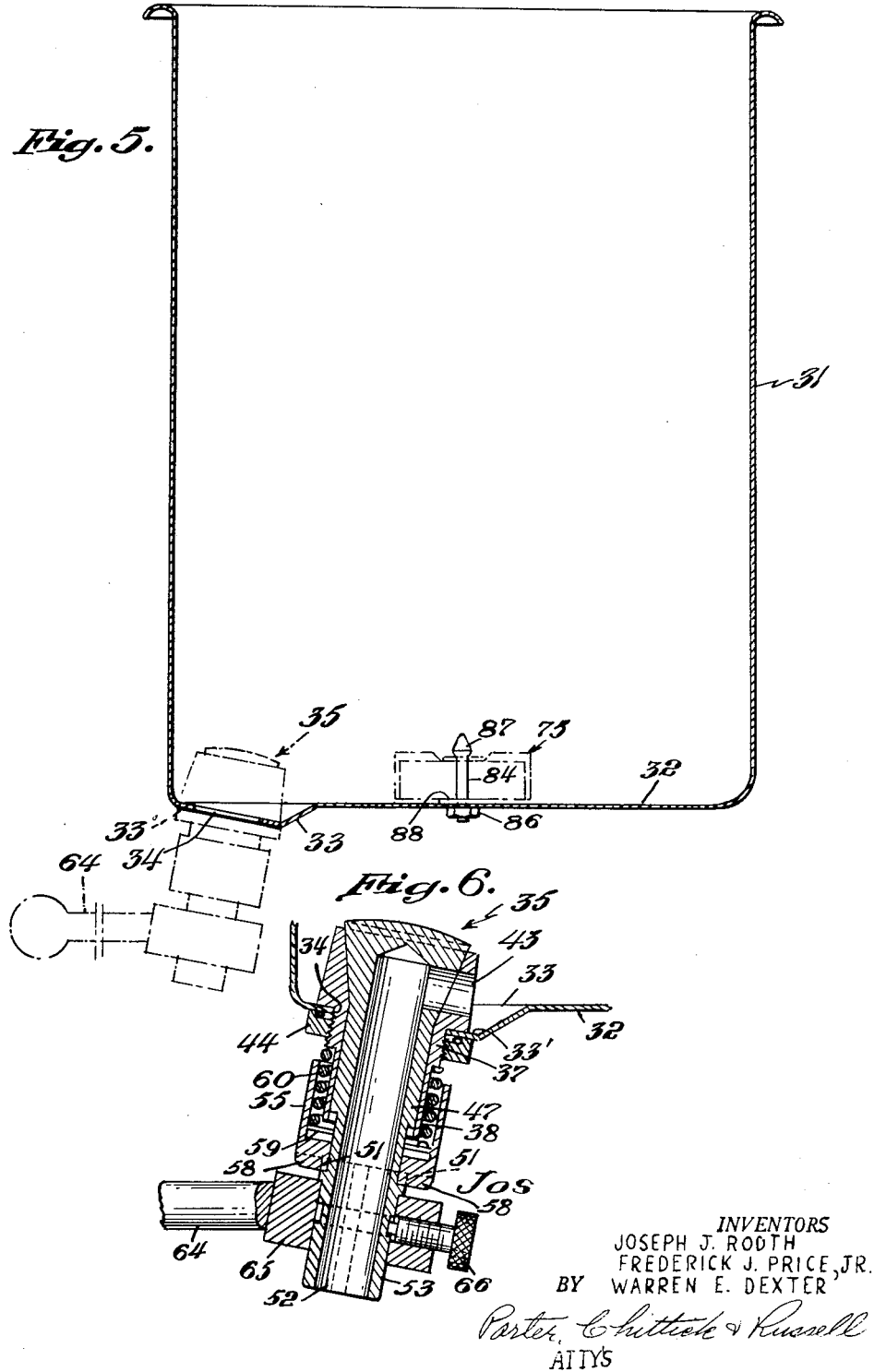

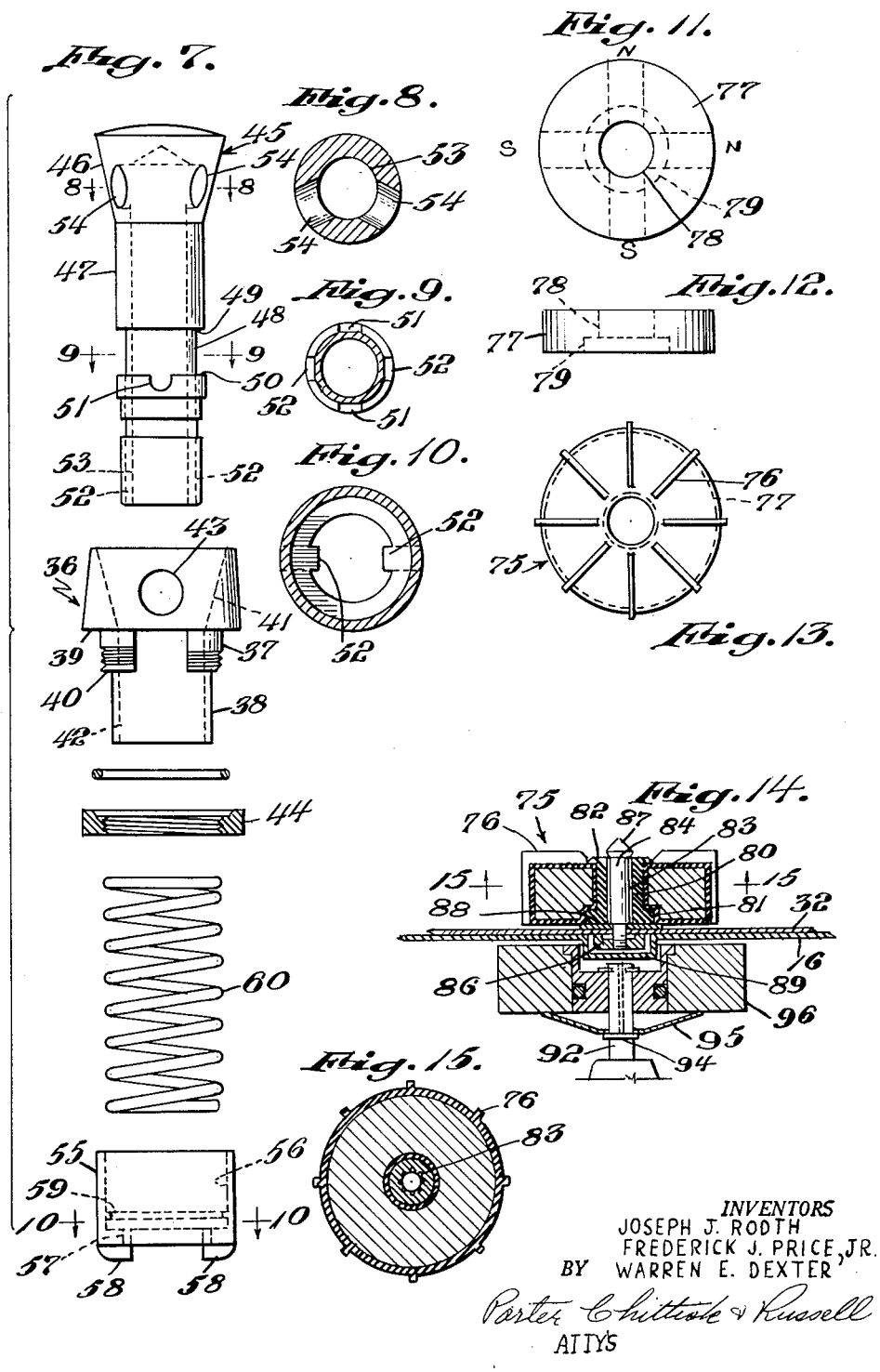

INVENTORS
JOSEPH J. RODTH
FREDERICK J. PRICE, JR.
BY WARREN E. DEXTER

ATTYS

United States Patent Office 3,045,869
Patented July 24, 1962

3,045,869
BEVERAGE DISPENSING APPARATUS
AND METHOD
Joseph J. Rodth, Swansea, Frederick J. Price, Jr., Saugus, and Warren E. Dexter, Raynham, Mass., assignors to The Dane Corporation, Cambridge, Mass., a corporation of Massachusetts
Filed Dec. 17, 1958, Ser. No. 781,164
13 Claims. (Cl. 222—39)

This invention relates to a beverage or the like dispensing apparatus more particularly designed for the dispensing of such material as hot chocolate.

In the dispensing of a beverage it is essential that provision be made for cleaning the apparatus from which the beverage is dispensed.

Heretofore in the use of an apparatus of this character, it has sometimes been necessary to move the apparatus to a sink where scouring and washing may be had, thus requiring a portable apparatus for this purpose. In cases where the apparatus is not of such a character that it may be transported, then other means are necessary in order that the apparatus be scoured for cleanliness.

One of the objects of this invention is to provide an apparatus which may be easily cleaned for sanitation purposes.

Another object of this invention is to provide a structure so that the liquid containing pot may be easily removed for cleaning and inasmuch as this pot is to be heated and has the liquid drawn therefrom, this general object requires many specific treatments.

Another object of the invention is to provide an agitator within the liquid containing pot which may be driven by magnetic means so that it is not necessary to pass a shaft through a wall of the pot and then seal the shaft against leakage and coupled with this object there is the object of providing an agitator which, although easily removable from the pot, will not drop out of the pot accidently and become lost.

Another object of the invention is to provide a dispensing spigot which will present no problems in removing the pot for cleaning.

A further object of the invention is to provide a dispensing spigot which may be easily disassembled and cleaned for sanitation purposes.

Another object of the invention is to provide means for heating the pot which is of such a construction that the pot may be easily removed and replaced without disturbing the heating means.

A further object of the invention is to provide means which will be controlled by the liquid in the pot for either automatically shutting off operating mechanism or for signalling to an attendant upon the occurrence of some low temperature or low liquid level in the apparatus.

A still further object of the invention is to provide a spigot for dispensing the liquid from the apparatus which may be operated by movement in either direction and which will return to inoperative position when disengaged by the person using the same.

Still another object of the invention is to provide means for entraining air bubbles in the hot beverage to improve the smoothness of its texture without necessitating the addition of expensive and/or highly caloried creams. In this connection it is a more specific object of the invention to provide a means for attaining and automatically maintaining a desired proportion of entrained air.

With these and other objects in view, the invention consists of certain novel features of construction as will be more fully described and particularly pointed out in the appended claims.

In the accompanying drawings:

FIGURE 1 is a vertical sectional view showing the general arrangement of the parts of the apparatus;

FIGURE 2 is a sectional view on line 2—2 of FIGURE 1 with the pot omitted;

FIGURE 3 is a sectional view on larger scale of the support upon which the pot is mounted;

FIGURE 4 is a sectional view through the forward part of the dividing wall upon which the pot support is mounted;

FIGURE 5 is a sectional view of the pot alone illustrating in dotted line position the agitator and a part of the spigot which is removable with the pot from the apparatus;

FIGURE 6 is a sectional view of the spigot;

FIGURE 7 is an exploded view of the spigot showing its various parts;

FIGURES 8, 9, 10 are sectional views on lines 8—8, 9—9 and 10—10 of FIGURE 7;

FIGURE 11 is a plan view of the core of the agitator;

FIGURE 12 is a side elevation of the core;

FIGURE 13 is a plan view of the agitator;

FIGURE 14 is a fragmental sectional view of the agitator and the drive therefor;

FIGURE 15 is a section on line 15—15 of FIGURE 14;

Figure 16:
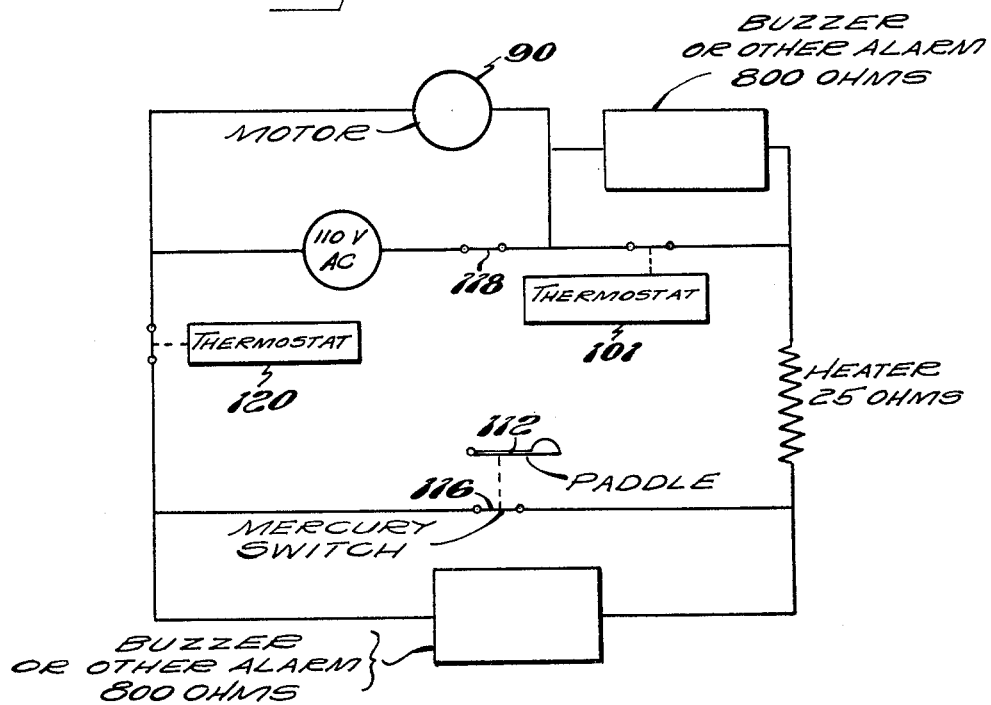
FIGURE 16 is a wiring diagram of the circuitry employed.

In proceeding with this invention, we provide an apparatus which is generally portable but may be set upon a counter with a pot for containing liquid to be dispensed at a sufficiently elevated point so that a cup or other liquid containing drinking unit may be positioned beneath a spigot to have the liquid gravity fed into the cup or container. A drip receptacle is usually associated with the portion upon which the cup may rest while the liquid container or pot is easily removable and easily cleaned. We provide an agitator in the pot to be magnetically coupled to a drive outside of the pot so that a drive shaft for the agitator need not pass through the wall of the container. Thus the agitator will be within the pot and removable with the pot from the apparatus and a provision is made so that this agitator cannot drop out of the pot to become lost while a provision is also made so that the agitator may be manually removed easily from the pot. A further provision is that the spigot will be removed with the pot and may be itself easily manually removed from the pot and disassembled for cleaning. For simplicity of operation the spigot may be moved in either direction by a handle for discharge of the liquid from the container and will be repositioned into neutral position when manually released. We also provide a casing about the pot which is so arranged that it snugly engages the pot with a resilient action while permitting the pot to be removed without dismantling the casing. We also provide a heat responsive means carried by this casing to contact the pot although not interfering with its removal to indicate a low level of liquid in the pot or some failure of a heating means which means may also automatically shut off any mechanical operation of parts of the apparatus.

The dispensing apparatus of the present invention is particularly adapted for use in dispensing a hot beverage such as a hot chocolate beverage which requires stirring so as to prevent the sediment contents thereof from settling, and which is improved in texture by the presence of an appreciable portion of minute entrained air bubbles. Such apparatus is shown in the drawings in which 10 designates a housing having a base portion 11 and upright sheet metal walls 12. A horizontal wall 13 is positioned above the base 11 and is provided with upright flange portions 14 which engages the walls 12 and are secured thereto in appropriate manner as by fastenings 15. The wall 13 serves as a support for supporting various parts of the apparatus. A generally circular inverted traylike member or support 16 extends upwardly from the wall 13 and has a generally triangular shaped recess 17 extending inwardly from the circular periphery thereof. This member 16 is made of a thin sheet non-ferrous or non-magnetic material and serves as a shield to protect moving parts, as a support for the vessel or pot for the beverage and as a limit for the contraction of the sleeve.

The upper edge portions of walls 12 are reduced and form a shoulder 18 to receive a removable cover 12′ and to provide a short wall portion 19 to which is attached a ring 20 of Z shape cross section providing a circular opening which is surrounded by an annular lip 21 from which there is suspended an axially split cylindrical sleeve 22. The sleeve 22 has an outwardly and downwardly reversely extending rim portion 23 at the upper end thereof and a reinforcing band 24 at the lower edge thereof. The marginal longitudinal free edge portion along the split of the sleeve is bent outwardly at a general right angle and provide oppositely disposed lips 25 (see FIGURE 2) which are adapted to engage each other so as to limit the contraction of this sleeve under bias of a plurality of pull springs 26. At the upper portion of the sleeves spring 26 has one end thereof secured to a pin 27 located on the sleeve at one side of the lips 25 and extends across said lips and is secured at the other end thereof in a similar way to a pin 27′. At the lower portion the sleeve is contracted through the heater as will be hereinafter described. It will be apparent that in both cases the springs will tend to contract the sleeve and will yield to allow expansion of the sleeve. The rim 23 hooks over the annular lip 21 to suspend the sleeve therefrom with the lower edge thereof extending about the periphery of member 16 in spaced relation therewith.

The sleeve 22 is held in proper relation and against upward axial movement by pull springs 28 each of which is provided at one end thereof with a hook 29 which extends through an opening 30 in wall 13 to be hooked in the lower edge of the sleeve. The other end of the spring is likewise provided with a hook 29′ which is attached at some convenient location on the base 11.

The beverage container or pot 31 is made of relatively thin stainless steel sufficiently high in nickel to be non-magnetic and is of cylindrical shape (see also FIGURE 5) and open at the upper end and has a generally flat bottom wall 32. The wall 32 has a generally circular depression or wall 33 the bottom wall 33′ of which extends on a downward slant towards the center of the pot from the edge of the bottom wall 32. The wall 33′ has an opening 34 therethrough about the marginal edge of which there is detachably mounted a valve or spigot 35.

The spigot 35 (see particularly FIGURE 7) has a body portion 36 reduced as at 37 and 38 and providing shoulders 39, 40 respectively. A tapered bore 41 which forms a valve seat extends inwardly from the upper end of the body and intersects with a straight bore portion 42 which extends to the other end of the body. A circular opening 43 at right angles to the axis of the body and bore extends from the periphery of the body to intersect the tapered bore 41.

The reduced portions of the body 36 extend through the opening 34 in the pot with the shoulder 39 engaging the inclined bottom wall 33′ so that its axis is outwardly inclined from the axis of the pot. The reduced portion 37 is screw threaded and is engaged by a clamp nut 44 to secure the said body to the wall 33 in the known manner, an O-ring seal being positioned between the wall 33 and the nut 44.

A closure plug 45 is rotatably mounted within the body 36 and has a head portion 46 of inverted frustro conical shape complemental to the walls of valve seat 41 which it engages in liquid tight engagement. A stem 47 extends from the head 45 and passes through the bore 42 in rotatable relation therewith and is provided with a reduced portion 48 which forms opposite shoulders 49, 50. The shoulder 50 has diametrically opposite recesses 51 which extend radially from the reduced portion 48. The stem 47 is also provided with oppositely disposed axially extending grooves 52 which are positioned substantially at right angles to the said recesses 51. A bore 53 extends upwardly through stem 47 and intersects right angularly disposed openings 54 which extend radially to the tapered side of head 46 and in the plane of opening 43. In the present instance the openings 54 are angularly spaced apart approximately 130° and each may be moved into registry with opening 43 so as to provide a passageway leading through the wall 33.

The closure plug 45 is retained in proper relation by means of a retainer collar 55 having a bore 56 with a reduced portion 57 which is of a diameter to have sliding relation on the stem 47. There is provided at the lower end of the collar 55 splines 58 which are diametrically oppositely disposed and extend into the bore 57 and beneath the lower end of the collar 55. The collar has a seat 59 in the bore 56 for a purpose which will hereinafter appear. Prior to assembling the collar 55 on the stem 47, a compression spring 60 placed in position about said stem to engage the shoulder 40 on the body 36. The collar is next positioned about the stem with the splines 58 positioned in registry with the grooves 52 which will allow the retaining collar to be slid along the stem 36 for the bore 56 to receive the spring for engagement of the free end thereof with the seat 59. The collar 55 then is moved further along the stem until the splines 58 move free of the inner ends of grooves 52 and in the space between shoulder 49 and 50 which will allow the collar 55 to be turned to move said splines 58 into registry with and seat in recesses 51 and there be held by the compression of spring 60.

Upon assembling the spigot in position on the pot 31, the pot may be inserted in the sleeve 22 so as to rest upon the upper side of member 16. The diameter of the pot 31 is made slightly larger than the normal diameter of the sleeve when the same is in contracted relation. The lower edge of the pot 31 is rounded so as to allow the pot to be inserted with a wedge like action in the sleeve and as the pot is slid inwardly the sleeve will expand against the spring bias thereon. Thus the pot will be frictionally held in good heat transfer relation with the walls of said sleeve. In inserting the pot 31 within the sleeve 22, the spigot is positioned to be in registry with the recess 17 in member 16.

It will be seen in FIGURES 1 and 6 the spigot projects on an outward slant from the axis of the pot and is of a length to extend below the wall 13 which has an opening 61 therethrough through which the lower end portion of the spigot passes to position it over the open portion of base 11. This open portion of the base has a dish like depression 62 provided at the upper side thereof with a drainage rack 63 which also serves as a support for cups and the like containers into which the beverage may be disposed.

A handle 64 is provided for moving the closure plug 45 to open and closed relation. The handle has an enlarged head 65 with a bore which receives the stem 47 and is affixed thereto by a manually operated clamp screw 66. The handle 64 extends generally in a horizontal plane and may be turned in either direction to move either of openings 54 into registry with the opening 43 as previously described. The handle is manually moved to open relation and automatically returned to the neutral or closed position in the following manner. A pair of arcuate arms 67 and 68 (see FIGURE 2) are pivotally mounted at one end thereof on a pivot stud 69 (see FIGURE 4) for free rotation thereabout. The other end of the arms each carry a stationary stud 70 which depends therefrom to pass through a guide slot 71 which extends on an arc whose radius is the axis of the pivot stud 69. The stud 70 carries a roller 72 which depends in the path of movement of the handle 644. A torsion spring 73 is mounted on pivot 69 and one arm thereof extends to engage a button 74 on arm 67, and the other arm of the spring extends to engage against a similar button 74 on arm 68. The spring 73 tends to urge the arms to move inwardly towards each other for the rollers 72 to engage opposite sides of the handle 64 in the neutral position thereof. It will be seen in FIGURE 2 that movement of the handle 64 from the central position to the left will through engagement with the roller 72 of arm 67, cause arm 67 to be moved to the left as shown in broken lines at which position one of the said openings 54 will be in registry with the opening 43. Upon release of the handle, the arm 67 under urge of spring 73 will return the handle to neutral or closed relation. Moving the handle 64 in the other direction will in a like manner move arm 68 to the right and upon release of said handle, the arm under urge of spring 73 will likewise return the handle to closed position.

As previously stated the agitator for stirring the beverage is driven through a magnetic drive. To this end the agitator designated generally 75 (see FIGURES 11 to 15) has a plurality of vanes 76 which are equally spaced and which extend radially from adjacent to the center of the impeller to the outer periphery thereof. The impeller has a magnetic core 77 which may be of any suitable manufacture. In the present instance the core 77 is a disk of a ceramic composition embedding magnetic material which is arranged in a way and so magnitized as to result in pairs of opposite poles extending at right angles to each other and diametrically disposed as indicated in FIGURE 11. The magnetic core 77 has a central bore 78 which is enlarged as at 79. The core 77 is embedded in a rubber or suitable plastic material as by a molding operation so as to provide the vanes 76 above described and completely incase the core with said material. A bearing sleeve 80 made of a resilient compressible material is inserted in the bore 78 and has an enlarged diameter 81 to engage in the bore portion 79. The bearing also has an enlarged head 82 which is made slightly larger than the diameter of bore 78 and which will compress to be passed through said bore 78 and recover to snap over the upper edge of said bore 78 to hold the bearing fastened to the agitator. The bore through the bearing sleeve has a plurality of axial extending grooves 83 (see FIGURE 15) which are equally spaced for a purpose which will hereinafter appear.

The agitator is mounted for free rotation on a stud 84 (FIGURE 14) which is fixed centrally on the bottom wall 32 of pot 31. This stud has a reduced threaded portion 85 which projects through wall 32 and is engaged by a clamp nut 86 which secures the stud in position in a known manner. The free end of the stud has an enlarged tapered head 87 which is made slightly larger than the bore through sleeve 80 the walls of which will yield when positioning the agitator on the stud and which upon the head 87 passing the upper end of the sleeve will recover to expand beneath said head and be returned thereby against removal by a force equal to its own weight. A hard chrome bearing washer 88 is interposed between the agitator and the wall 32 and on which the agitator revolves. Thus the agitator may be manually removed or positioned on the stud 80 with ease but will be securely held against removal upon inverting the pot when draining the same. In that the reduced portion of the stud 80 and retaining clamp nut extends beneath the wall 32, a circular depression 89 is provided in the upper wall of member 16 for receiving said depending portions. In some instances we may secure the stud 80 directly to the upper side of wall 32 such as by a welding operation and in which case the said depression 89 will be omitted.

The agitator is rotated by means of a motor 90 which may be secured in an operative position by suspension from said wall 13 by any appropriate means, as by fastening 91 extending through said wall and engaged in one end of the motor so as to hold the same in vertical position. The shaft 92 of the motor extends through an opening 93 in wall 13 and has an annular abutment 94 against which a cup spring 95 rests. A magnet 96 which is of a type similar to the magnet core 77 previously described has a bearing 97 made of non-magnetic metal positioned on the shaft 92 to rest on the spring 95 and is held therein under bias of said spring by a snap ring fastening 98 engaging in a complemental groove in said shaft. The magnet 96 extends in juxtaposition to the upper wall of member 16 which is made of non-magnetic material, the pot 31 also being of non-magnetic material, so that a strong magnetic field will be had to provide the necessary magnetic coupling between the driver and driven magnets. No ferrous or magnetic material is interposed between the magnetically coupled members 75 and 96.

It will be apparent upon rotation of magnet 96 that when opposite poles of the magnets 96 and agitator come into registry there will be a magnetic coupling between the two so that they will revolve together as a unit for the agitator to stir the contents of the pot to mix and prevent the sediment contents of the beverage from settling and to inject minute air bubbles into the beverage as will be described more in detail below. It will also be apparent that as the agitator rotates, liquid will flow through grooves 83 of its bearing and provide a lubricant between the agitator and chrome washer so as to reduce wear of the parts of the agitator in contact therewith.

The beverage is maintained within a safe temperature for serving on demand by means of an electric heater unit 100 which may be of any suitable manufacture which may be thermostatically controlled. In the present instance the heater unit 100 is shown conventionally and may be secured on the outer side of sleeve 22 in heat transfer relation therewith by a pair of springs 106 attached to pins 107, 107' on the heater which springs also serve to contract the split sleeve and hold it in frictional engagement with the pot.

It is desirable to provide means for indicating when the pot 31 is empty or nearly so, or when the heater unit 100 has overheated the upper portions of the pot 31. Accordingly, in one embodiment a thermostatic device 101 is mounted on a flat spring 102 which is fastened to the sleeve 22. The thermostat 101 has a temperature detecting portion which extends through an opening 103 in the sleeve 22 and engages the pot 31 at a predetermined location above the upper edge of heater unit 100 which is in heat transfer relation therewith through sleeve 22. As the contents of the pot 31 are reduced and there is no liquid at the detecting location to pick up heat, the temperature of the side of the pot above the liquid rises. When the pot 31 is empty or nearly so of said contents, the temperature of the wall of the pot will be transmitted thereto through the heating unit 100. Thus, the thermostat is set to be activated at said temperature of the pot when nearly empty to control electric circuits for turning off the heater and activating an alarm or warning mechanism. The pot 31 may have a cover 110 with handle 111 thereon for sanitary purposes and to better confine the heat therein.

Figure 17:
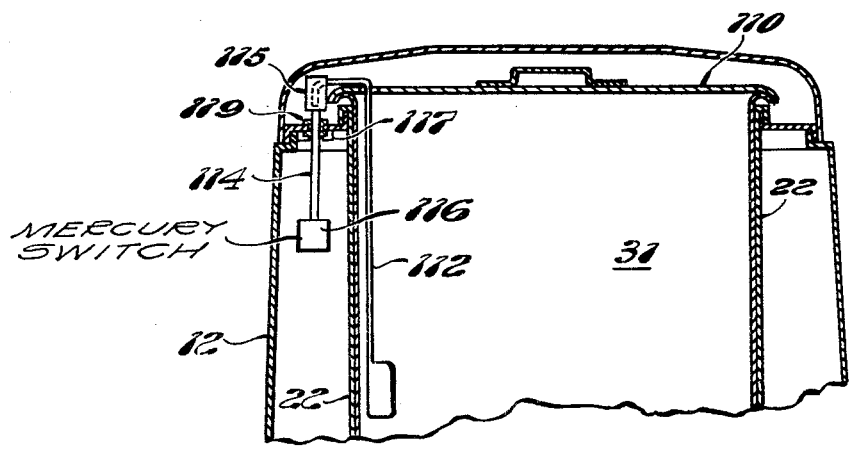
FIGURE 17 is a view illustrating a low liquid level shut-off mechanism.

In addition to the thermostat 101, we may provide a low liquid level safety or alarm mechanism illustrated in FIGURE 17, and including a pivotally mounted paddle 112 positioned to extend downwardly into the pot 31 along its side to a level below which the beverage should not drop. The paddle 112 connects to a pin 114 by means of a slotted joint 115 arranged to permit the paddle 112 to be disconnected conveniently from the pin 114 when the pot 31 is to be removed from the dispenser. The pin 114 is held in position by a pivot 117 secured to the main frame of the dispenser and is sealed therein by a silicone rubber gasket 119. The pin 114 carries a mercury switch 116 on its lower extremity which is open when the pin 114 and paddle 112 are vertical, but which is closed when the pin 114 tilts it to an inclined position. Thus, as the hot beverage swirls around (as long as it comes up to the height of the paddle 112) it swings the paddle 112 along with it to the limit of its pivotal motion thereby tilting the mercury switch 116 and keeping it in the closed position.

The electrical circuit for the various operating components is shown in FIGURE 16 where it will be seen that a conventional 110V A.C. source of power is used, with a main "on-off" switch 118 in series. The motor 90 is turned on by switch 118 and runs constantly as long as the power is on. The heater 100 is likewise turned on by the switch 118, but the thermostat 101 and mercury switch 116 are in series with the heater 100, and therefore, both must be closed in order for the heater 100 to function. Normally at the start of operations and once the impeller or agitator has commenced swirling the beverage around, both the thermostat 101 and mercury switch 116 will be closed and the heater 100 will commence heating up the beverage. Thereafter, if the liquid level drops below the critical minimum, or if the swirling action stops, or if the wall of the pot 31 becomes too hot, the mercury switch 116 or the thermostat 101 will open the circuit to the heater 100. When such happens it is desirable to provide an alarm or warning device and we do this by establishing parallel alarm circuits having comparatively very high resistance. The heater 100 has a resistance of approximately 25 ohms. The alarm devices (which may be buzzers, lights or even alarm functioning relays) however, may have a resistance of about 800 ohms. Thus when the thermostat 101 or mercury switch 116 are closed they, in effect, short circuit their respective alarms, but when they are open, their respective alarms commence operating and since the alarms draw very little current, the heater 100 is virtually shut off. It will be understood that these various elements just described are safety features and that a conventional beverage temperature control thermostat 120 is, of course, employed in the heating circuit for the purpose of maintaining the beverage at approximately the correct temperature. Usually the thermostat 120 will be placed touching the bottom of the pot 31.

It will now be seen that the dispenser of our invention will not scorch the beverage. In the first place, the heater will not operate unless the liquid level is above the critical minimum level and unless it is in motion. Secondly, if the pot becomes too hot, even though the liquid level is high enough and adequately in motion, the heater will stop. In some applications the thermostat 101 may be dispensed with if the paddle 112 and mercury switch 116 are employed, and therefore in this application we intend to claim it broadly in combination with its use in a swirling liquid dispenser as described.

Turning now to the means for injecting minute air bubbles into the hot beverage, this is done by the agitator 75, and the correct proportion of air bubbles to liquid is controlled by the size and location of the vanes 76 in relation to the rotational velocity of the agitator 75. When operations commence, the agitator 75 swirls the beverage around at an ever increasing rate until a vortex is created extending down through the center of the pot to the agitator 75. When the vortex touches the agitator 75, air is drawn down and ejected radially into the beverage. This continues to take place until the beverage starts building up a creamy or more viscous body at which point the swirling rate slows down a little and the vortex temporarily shortens up. Thereupon air is not again drawn in by the agitator 75 until the beverage loses some of its air and again starts swirling at a faster rate. In this way the beverage gradually becomes loaded with very fine air bubbles, and the balance of air to liquid is automatically maintained. It will be understood, of course, that any desired balance of air to liquid can be maintained within reasonable limits by this device simply by increasing or decreasing the ejecting action of the agitator 75. The important conditions to observe are simply to maintain a uniform and straight vortex as we provide with our cylindrical pot 31, and to have the bottom point of the vortex fluctuating between actually touching the agitator 75 to a point shortly above the agitator 75. In view of its major importance in the context of this type of dispenser, we intend to claim this air entrainment mechanism and automatic control broadly herein in combination with a swirling liquid beverage dispenser.

From the above it may now be seen that we have disclosed a food or beverage dispenser which is of relatively simple construction and in which the elements carried by the food container may be easily removed to facilitate a thorough cleaning of all the parts which come into contact with the food or beverage. It will also be apparent that the sediment contents of a chocolate beverage and the like will be maintained in suspension properly mixed with air bubbles and ready to be served on demand.

We claim:

1. A hot beverage dispenser comprising: a base, a removable pot for said beverage mounted on said base, agitator means for storing said beverage in said pot in a circular path, means for heating said pot and beverage including a heating coil of relatively low electrical resistance, alarm means associated with said coil, said alarm means having realtively high electrical resistance and being connected in series with said heating coil, switch means connected in parallel with said alarm means and, when closed, shunting said alarm means whereby said heater is operated effectively only when said switch is closed, and mechanism for opening said switch when said agitator is not so stirring said beverage or when the level of said beverage in said pot while being so stirred falls below a predetermined level.

2. The dispenser defined in claim 1 further characterized by said mechanism for opening said switch comprising a pivotally mounted paddle extending down into said pot to said predetermined level and said switch being closed only when said paddle is pivoted in response to stirring motion of said beverage at a level in said pot above said predetermined level.

3. A hot beverage dispenser comprising: a base, a removable pot for said beverage mounted on said base, agitator means for stirring said beverage in said pot in a circular path, means for heating said pot and beverage including a heating coil of relatively low electrical resistance, alarm means associated with said coil, said alarm means having relatively high electrical resistance and being connected in series with said heating coil, temperature responsive switch means positioned to sense the temperature of said pot at a given location thereon, said switch means being connected in parallel with said alarm means and shunting said alarm when the temperature of said pot at said given location remains below a predetermined value but opening and causing current to pass through said alarm when said temperature rises above said predetermined value, whereby said alarm means is actuated only when said switch is open and whereby the current through said coil is so reduced when said alarm is so actuated that the heating function of said coil is effectively stopped.

4. The beverage dispenser defined in claim 3 further characterized by temperature responsive means for maintaining the temperature of said beverage at the bottom of said pot at a drinking temperature substantially below said predetermined level, and said temperature responsive switch means being located at an elevated point on the side wall of said pot.

5. A beverage dispenser comprising a base, a pot for beverage mounted on said base and an agitator at the bottom of said pot adapted to stir said beverage in a circular path to create a vortex therein, said pot being free of obstruction above said agitator, to impel air radially into said beverage from the base of said vortex when said vortex extends the whole way to said agitator, said means on the agitator and the rotational velocity of the agitator being related so as to control the depth of vortex toward the agitator.

6. A beverage dispenser according to claim 5 characterized by an alarm for indicating when said beverage is not circulating in said circulatory path above a predetermined minimum rate.

7. A beverage dispenser according to claim 6 characterized by means for effecting operation of said alarm both when said agitator fails to act at commencement of operation of said dispenser and when the level of said beverage falls below a predetermined value when said agitator is stirring.

8. A beverage dispenser according to claim 7 having a heater associated with said pot, characterized by said means for effecting operation of said alarm, also effectively stopping said heater concurrently with operation of said alarm.

9. A beverage dispenser according to claim 8 characterized by said heater comprising a coil of relatively low electrical resistance, said alarm being associated with said coil and having relatively high electrical resistance and being connected in series with said heating coil, and said means for effecting operation of said alarm comprising a switch connected in parallel with said alarm, and when closed, shunting said alarm whereby said heater is operated effectively only when said switch is closed, and a device for opening said switch when said agitator is not stirring said beverage or when the level of said beverage in said pot while being stirred falls below said predetermined level.

10. A beverage dispenser according to claim 9 characterized by said device for opening said switch comprising a pivotally mounted paddle extending down into said pot to said predetermined level, and said switch being closed only when said paddle is pivoted in response to stirring motion of said beverage at a level in said pot above said predetermined level.

11. A method for preparing beverages for dispensing including stirring said beverage in a circular path with a vane agitator in a container unobstructed at its center from adjacent its bottom to create a vortex therein, and characterized by stirring said beverage at its bottom at a velocity such that said vortex extends approximately to the bottom of said container, entraining air in said beverage by drawing air from said vortex at the bottom of said container and impelling it radially into said beverage, and maintaining the proportion of said entrained air in said beverage at a predetermined value by controlling the size and location of the vanes on the agitator in relation to the rotational velocity of the agitator so as to position said vortex near to but not at the bottom of said container when the said predetermined value exists.

12. A method according to claim 11 characterized by heating said beverage only so long as said vortex in said beverage exists.

13. A method according to claim 12 characterized by heating said beverage only so long as the amount of said beverage in said container exceeds a predetermined level.

References Cited in the file of this patent

UNITED STATES PATENTS

| 1,836,893 | Austin | Dec. 15, 1931 |
| 2,070,545 | Gilbert | Feb. 9, 1937 |

FOREIGN PATENTS

| 369,098 | Italy | Mar. 11, 1939 |